(12) United States Patent
Feichtinger et al.

(10) Patent No.: US 12,255,700 B2
(45) Date of Patent: Mar. 18, 2025

(54) DYNAMIC BBA GAIN FOR NEAR-FIELD RADIO FREQUENCY SIGNAL PROCESSING

(71) Applicant: NXP B.V., Eindhoven (NL)

(72) Inventors: Mark Feichtinger, Graz (AT); Johannes Stahl, Graz (AT); Ulrich Andreas Muehlmann, Graz (AT); Markus Wobak, Graz (AT)

(73) Assignee: NXP B.V., Eindhoven (NL)

( * ) Notice: Subject to any disclaimer, the term of this patent is extended or adjusted under 35 U.S.C. 154(b) by 346 days.

(21) Appl. No.: 17/974,247

(22) Filed: Oct. 26, 2022

(65) Prior Publication Data

US 2024/0146357 A1    May 2, 2024

(51) Int. Cl.
*H04B 5/00* (2024.01)
*H04B 5/70* (2024.01)

(52) U.S. Cl.
CPC ..................... *H04B 5/70* (2024.01)

(58) Field of Classification Search
CPC ........... H04B 5/70; H04B 5/00; H04B 5/0025
See application file for complete search history.

(56) References Cited

U.S. PATENT DOCUMENTS

| | | | |
|---|---|---|---|
| 7,061,325 B2 * | 6/2006 | Pitz | H03F 3/45973 |
| | | | 330/289 |
| 7,420,410 B2 | 9/2008 | Ohba | |
| 9,497,578 B2 * | 11/2016 | Royston | H04B 1/1027 |
| 2009/0027127 A1 | 1/2009 | Muhammad et al. | |
| 2016/0066131 A1 | 3/2016 | Royston | |
| 2022/0123785 A1 | 4/2022 | Stahl et al. | |
| 2022/0231728 A1 | 7/2022 | Wobak et al. | |

* cited by examiner

*Primary Examiner* — Tuan H Nguyen

(57) ABSTRACT

A system includes a signal processing unit including an antenna configured to receive a radio frequency signal as a received radio frequency signal, and a baseband amplifier coupled to the antenna. The system includes a processor configured to cause the communication unit to stop generating a radio frequency polling signal, set an amplification gain of the baseband amplifier to a first gain value, periodically record, at a sample rate, an indication of a magnitude of the amplified radio frequency signal to generate a plurality of sample values, at a predetermined time interval after the communication unit stopped generating the radio frequency polling signal, set the amplification gain of the baseband amplifier to a second gain value, and transmit the plurality of sample values to a classifier module to determine whether the radio frequency signal is received from a near-field communication-enabled device.

20 Claims, 10 Drawing Sheets

DYNAMIC BBA GAIN FOR NEAR-FIELD RADIO FREQUENCY SIGNAL PROCESSING

TECHNICAL FIELD

The embodiments of the present disclosure described herein relate to radio frequency (RF) communications systems and, more specifically, to systems and methods for near field communication (NFC) devices with front end signal processing systems including adjustable baseband amplifiers for improved dynamic range.

BACKGROUND

In near-field communication (NFC) radio frequency (RF) communications, an NFC-enabled device periodically broadcasts short RF pulses that operate as polling signals to detect other NFC-enabled counterparts (e.g., an NFC reader or an NFC tag) in its vicinity. To preserve the device's battery power, these polling messages are often transmitted in a low-power mode in which various functions of the transmitting device are disabled until an NFC-enabled counterpart is detected. If a valid NFC counterpart is detected in response to the polling signal transmissions, the NFC-enabled device switches to a normal power mode to initiate regular communications with the detected counterpart device. This transition into the normal power mode is referred to as a wakeup event. If no counterpart devices are detected, the device continues operations in the low power mode. A valid NFC-enabled counterpart device may be referred as a counterpart of interest (COI) in this disclosure.

In general, it is important that an NFC-enabled device correctly identify COIs based on polling message responses and avoids incorrectly determining a RF reflection signal resulting from a polling message (e.g., reflecting from a metal object or other antenna) is received from a COI. Incorrectly characterizing a received signal may result in false wakeup events. A high number of false wakeup events due to misinterpretation of reflected RF signals could lead to excessive power consumption in the device.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter of the application and uses of such embodiments. As used herein, the words "exemplary" and "example" mean "serving as an example, instance, or illustration." Any implementation or embodiment described herein as exemplary or an example is not necessarily to be construed as preferred or advantageous over other implementations. Furthermore, there is no intention to be bound by any expressed or implied theory presented in the preceding technical field, background, or the following detailed description.

Figure 1:
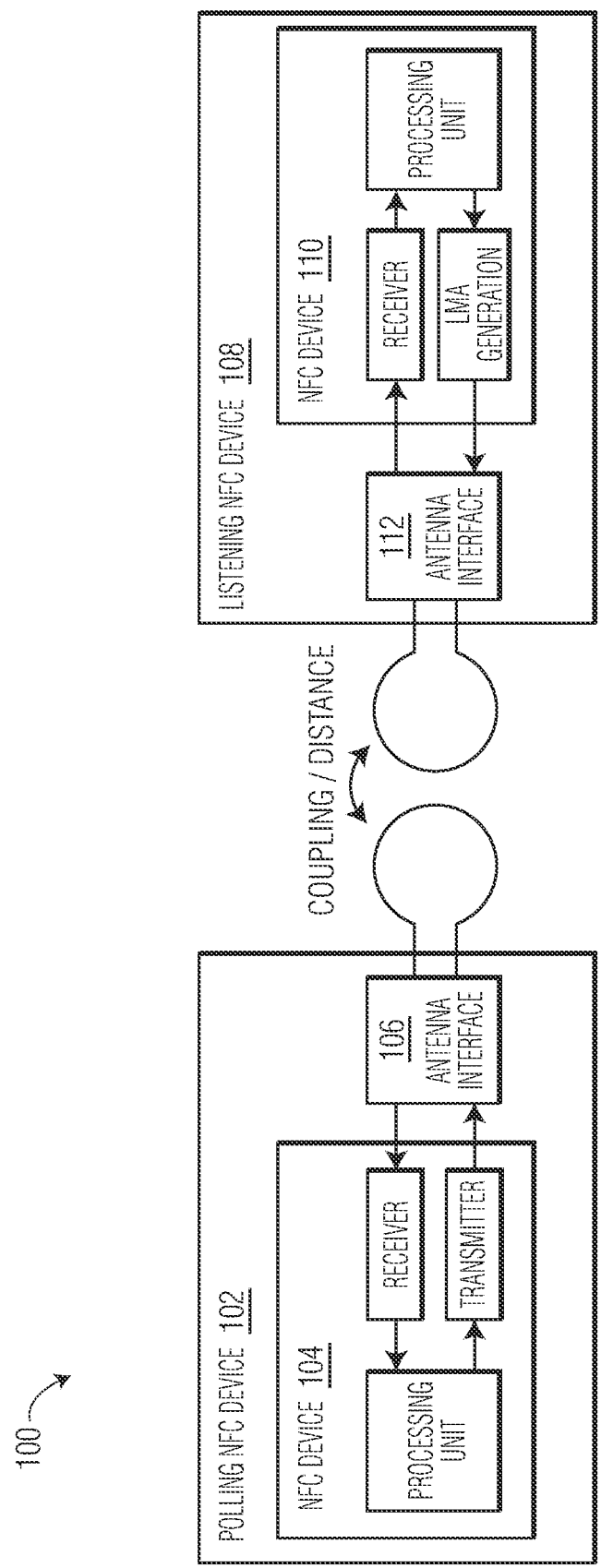
FIG. 1 shows an example of an NFC system.

FIG. 1 shows an example of an NFC system 100. The NFC system 100 comprises a polling NFC device 102 (i.e., a proximity coupling device) and a listening NFC device 108 (i.e., a proximity integrated circuit card), which are coupled to each other by means of inductive coupling. To enable such a coupling, the polling NFC device 102 comprises an NFC device 104 (i.e., a communication unit including a receiver, a transmitter, and a processing unit), an antenna interface 106 and an antenna. Similarly, the listening NFC device 108 comprises an NFC device 110 (i.e., a communication unit including a receiver, a load modulation amplitude (LMA) generation unit and a processing unit) an antenna interface 112 and an antenna.

In such a system, communication is normally initiated by the polling NFC device 102 sending a polling broadcast signal. After successful reception, the listening NFC device 108 will respond with a corresponding answer. The answer may be received to as an off-ringing signal that is generated in response to the transmitted polling message.

Active RFID/NFC devices (e.g., battery-powered tags) are typically small form factor devices. This small form factor can make it difficult to place reasonably sized antennas in such products. For passive tags, i.e., tags which are merely powered by the field, antennas should be properly sized, in order to achieve a satisfactory user experience. Nevertheless, passive tags are attractive in the sense that no battery is needed for their operation. NFC tags and devices can be detected without consuming a lot of power, and the relevant components of a reader device can be woken up if an approaching tag or device is detected.

When detecting NFC tags or devices, it is important that an NFC-enabled device precisely identify counterparts of interest (COIs) and avoid misinterpretation of signals reflected by nearby metal objects or other load changes as COIs, which can result in an unnecessary wakeup event. False wakeups due to such misinterpretations lead to a higher power consumption and, in a battery powered device, excessive consumption of power resources.

The present invention disclosure, therefore, provides a system and method to enhance the performance of a received signal processing chain of an NFC-enabled device prior to initiating device wakeup. In various embodiments, the present system and method may be implemented using a front-end signal processing system that operates to process signals received by an NFC-enabled device's antenna system.

Figure 2:
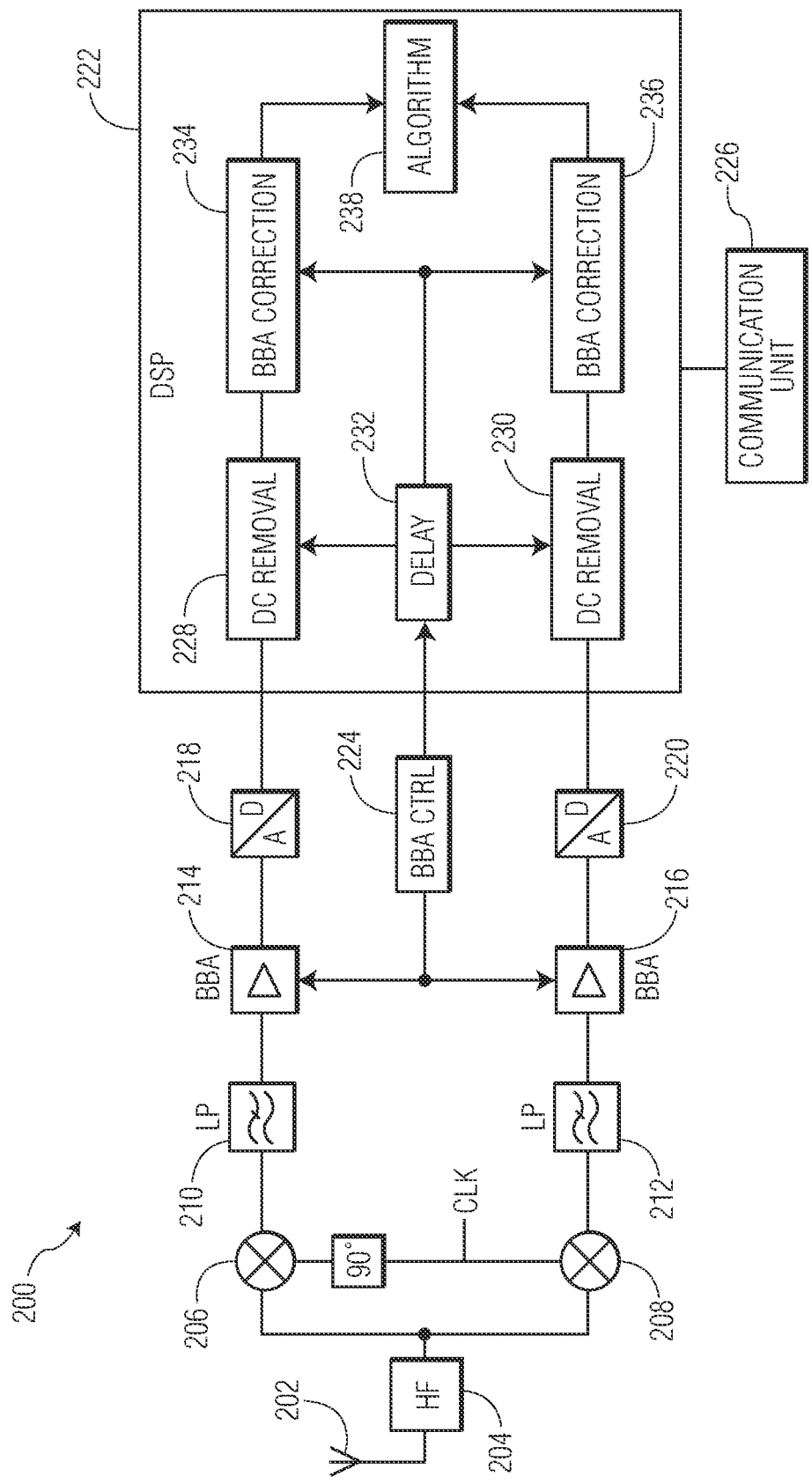
FIG. 2 depicts a typical receiving (RX) front end signal processing system of an NFC-enabled device.

FIG. 2 depicts a receiving (RX) front end signal processing system 200 of an NFC-enabled device in accordance with embodiments herein. Front end signal processing system 200 includes antenna 202 for receiving RF signals. Antenna 202 is connected to high-frequency attenuator 204, which is configured to hold the input signal in range. A mixer 206, 208 performs a down-conversion to the complex baseband, in the I-channel and the Q-channel. Signals in the I-channel and Q-channel are filtered by low pass filters 210, 212, respectively and are then amplified by a complex-valued baseband gain amplifier (BBAs 214, 216 for the I and Q channels) and a complex-valued analog-to-digital converter (I and Q channel ADCs 218, 220). The I and Q channels preserve the amplitude and phase information of the received signal.

A desired gain of BBAs 214, 216 is determined by digital signal processor 222. Once a desired gain is determined, digital signal processor 222 operates BBA control 224 block to cause each of BBAs 214, 216 to operate with the desired gain.

The processed signals are transmitted from ADCs 218, 220 to digital signal processor 222 for processing to determine whether a signal received by antenna 202 and processed by front end signal processing system 200 is a transmission from a COI that should result in device wakeup. Specifically, after receipt of signals from ADCs 218, 220, digital signal processor 222 is configured to perform a series of signal correction steps on the amplified data signals received from each of ADC 218 and ADC 220. That signal correction may include, as described herein, direct current (DC) error correction implemented by DC removal blocks 228, 230. As described herein, DC removal blocks 228, 230 may be configured to implement DC removal operations at a time period that is determined by the time at which the gain of BBAs 214, 216 is adjusted by BBA control 224 plus a certain time delay, which may be implemented by delay unit 232.

After performing DC removal using DC removal blocks 228, 230, processor 222 may be configured to perform some BBA gain correction on the signals received from each of DC removable blocks 228, 230, as described in more detail below. That BBA gain correction may be performed by BBA correction blocks 234, 236. Again, the timing of the operation of BBA correction blocks 234, 236 may be delayed with respect to any changes to the BBA gain of BBAs 214, 216, as implemented by delay unit 232.

Finally, the corrected signals received from BBA correction blocks 234, 236 are processed to determine whether the signals are likely received from a COI or a non-COI. In an embodiment, processor 222 may implement a characterization algorithm 238 to process and analyze the corrected signals to determine whether the signals are received from COIs.

In various embodiments, the functional blocks depicted within processor 222 may be implemented as software or logic within a processor unit that may comprise one or more interconnected integrated circuit. In other embodiments, the various functional blocks may be implemented by separate components of front-end signal processing system 200.

Processor 222 is connected to a communication unit 226, which is a subsystem of the NFC-enabled device (e.g., antenna interface 106 or NFC device 110 of FIG. 1) configured to transmit polling broadcast signals. Processor 222 is configured to monitor the transmission of the polling broadcast signals and, as described herein, is configured to synchronize the operations of front-end signal processing system 200 with the timing of the generation of any polling broadcast signals.

ADCs 218, 220 are configured to periodically sample the signal being received from BBAs 214, 216 and convert those sampled values into output digital values. Each sampled digital value is then output to processor 222 which can store and/or analyze the values. As such, the output of ADCs 218, 220 is a sequence of digital values that were sampled from the BBAs 214, 216, respectively, at a particular sample rate. As discussed herein, processor 222 is configured to sequence the operation of front-end signal processing system 200 to the transmission of polling message by communication unit 226 so that ADCs 218, 220 begin sampling at a time that is offset from when the polling broadcast ceases being transmitted by communication unit 226 such that sampling starts at about the time signals transmitted in response to that polling message are received at antenna 202.

Signals received by antenna 202 of front-end signal processing system 200 in response to polling broadcasts (referred to as off-ringing signals) may comprise broadband signals with a high dynamic range that decays quickly. Because such signals may contain information or data in both the high energy (i.e., higher magnitude) early portion of the signal and the (relatively) low energy (i.e., lower magnitude) later portions of the received signal, it can be important to ensure that both portions of the signal (i.e., the high energy and low energy portions) are well resolved by the ADCs 218, 220 of front-end signal processing system 200. Accordingly, signal clipping during the high energy early portions of the received signal needs to be avoided while, for the later, lower energy, portions of the received signal, high resolution (i.e., increased amplification) is required to achieve resolution and accurate signal processing.

Depending on the application, the high energy portion of received off-ringing signals may have signal magnitudes that are higher than those of the lower energy portion of the received off-ringing signal. In various implementations of the present system, the determination of what constitutes a "high-energy" portion of the received signal versus a "low-energy" portion of the signal may be defined during implementation design and corresponding product development. Depending upon the implementation requirements, the present system may be used to control active BBA gain adjustment for any portions of a received signal that may be characterized as high or low energy. The present disclosure provides a system and method that enables existing low-resolution ADCs to process an entire RF off-ringing signal by synchronizing the gain of a baseband amplifier (BBA) with the input signal to provide appropriate amplification of signal regardless of its energy level.

To improve signal processing of both the early high-energy portions and later low energy portions of signals received by front-end signal processing system 200 a sequentially increasing synchronized dynamic BBA gain setting may be utilized during receipt and processing of the received off-ringing signal to provide lower amplification of the earlier high energy portions of the received signal (e.g., to avoid signal clipping) and higher amplification of the decayed portion of the signal (e.g., to provide higher resolution of that low energy portion of the received signal).

Referring back to FIG. 2, a received signal at antenna 202 is attenuated by high-frequency attenuator 204. After the I/Q mixer 206, 208 stage and the low pass filter 210, 212 stage, BBA 214, 216 stage amplifies the received and filtered signal to a range where the ADCs 218, 220 do not experience clipping when converting the received signal into digital values. In conventional front-end signal processing systems, the amplification range of BBAs 214, 216 is a fixed value that is selected to ensure that the ADCs 218, 220 do not clip, even when processing the high energy portions of the received signal. In such systems, the fixed value amplification is inadequate to provide sufficient amplification of low energy portions of the received signals.

In contrast to conventional approaches, the present system and method implements a dynamic amplification gain level for BBAs 214, 216 stage. Specifically, the BBA 214, 216 gains are switched between different levels (e.g., two or more levels) synchronously to a control signal. The control signal is synchronized to the time at which polling message transmission ceases and can be used to modulate the gain of BBAs 214, 216 as signals received in response to the polling message decay.

Figures 3A, 3B:
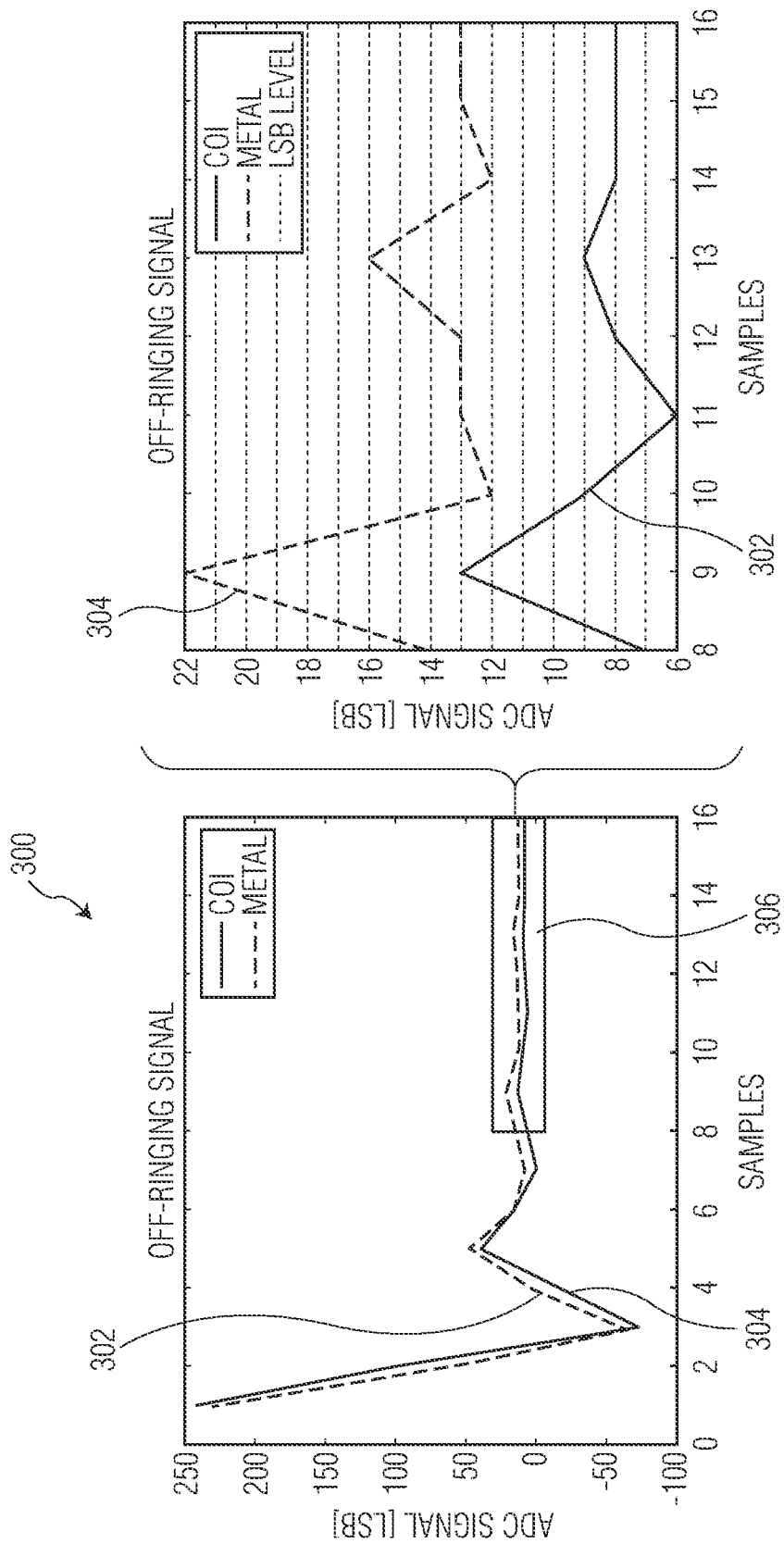
FIG. 3A is a chart 300 depicting example digital values outputted by a front-end signal processing system of an NFC-enabled device in response to a received off-ringing signal.
FIG. 3B is a chart depicting an enlarged portion of FIG. 3A.

FIG. 3A is a chart 300 depicting example digital values outputted by a front-end signal processing system (e.g., front end signal processing system 200) of an NFC-enabled device in response to a received off-ringing signal. In chart 300, the horizontal axis represents sample number, which occur over a period of time, while the vertical axis represents the digital value (e.g., output by ADCs 218, 220) that corresponds to the magnitude of the input signal (e.g., received at antenna 202). Trace 302 represent the digitized values of a signal as may be received from a legitimate COI. Trace 304 represents digitized values of a signal as it may be received from a non-COI, such as a reflection from a metal object.

As depicted in FIG. 3A, the magnitudes of the signals depicted by the values of traces 302 and 304 each decay quickly. FIG. 3B is a chart depicting an enlarged portion 306 of FIG. 3A showing that the trace 302 associated with a signal received from a COI and trace 304 associated with a signal received from a non-COI are, in fact different, but those differences are relatively small (e.g., only a few least significant bits in the measured values), particularly when compared with the high-energy portion of the traces (e.g., ranging from sample 0 through sample 8). In other words, for each signal (x[n]) represented by trace 302 or 304, the signal x[n], where n is the sample number and x[n] is a digital value representing the magnitude of the signal, decays to such a degree that changes in the signal only result in changes in a few least significant bit (LSB) after about eight samples and less than one LSB at the last sample (i.e., sample 16). Consequently, the later part of the signal (e.g., from sample 8 onwards) delivers relatively little new information that may be used or analyzed by a classifier to determine whether the received signal is from a COI or a non-COI.

To improve the resolution of the low energy decayed portion of a received off-ringing signal, the front-end signal processing system 200 of the present disclosure is configured such that BBAs 214, 216 are switched to a higher BBA gain as the number of samples of the off-ringing signal increases. By increasing the BBA gain, the latter (i.e., decayed) portions of the received signal oscillations of the off-ringing signal received in later samples are amplified and represented in x[n]. Accordingly, information contained with the decayed portion of the signal is preserved with the output x[n] and may be utilized by a classifier to perform classification.

In an example implementation, the gains of BBAs 214, 216 of front-end signal processing system 200 may be increased after the front-end signal processing system 200 has generated a particular number m of samples. The discrete number m can be variable and represents the number of samples after a received signal is first detected and generally corresponds to the sample number at which the receive signal transitions from high to low-energy. In such a system, the gain of BBAs 214, 216 may be adjusted only once to increase the gain from a default value after a certain number of samples have been captured. In other embodiments, multiple gain increases may be implemented in which the gain level is increased sequentially (e.g., from 0 dB, to 6 dB, to 12 dB) at each of a number of sample number (e.g., $m_1$, $m_2$, $m_3$, . . . ). Depending on the system implementation, the gain values of BBAs 214, 216 could be increased any number of times while samples of the received off-ringing signal are being received/processed.

Typically, the value of m or the values $m_n$ are selected on a per-application basis and may be fine-tuned or adjusted based on target application or system performance. In an embodiment, however, the value of m or the values $m_n$ may be at least partially determined based upon factors such as the carrier frequency $f_c$ of the system, an integer multiplier value $n \in [1,2,4]$ that is used to determine the system's sampling rate of the system $f_s$, and the system's antenna quality factor Q.

In these various implementations, it should be noted that if the BBA gain is (i.e., increased) too early (e.g., with reference to the example depicted in FIG. 3A, at a sample number before about 5), ADCs 218, 220 could go into clipping because the amplified analog signal could exceed the ADC 218, 220 input signal performance limits. Exceeding the maximum allowable input signal magnitude in the ADCs 218, 220 could cause distortion and degrade detection performance.

By increasing the BBA gain while the lower energy, decayed portions of the received off-ringing signal is being processed, it is possible to improve the dynamic range of the front-end signal processing system 200, without modifying the signal processing system's ADCs 218, 220 to increase resolution. Furthermore, by synchronizing modifications to the front-end BBA gain level precisely with the time when the transmitted RF polling broadcast field is turned off (e.g., by specifying the BBA gain be adjusted at a particular sample number), a very precise synchronized dynamic BBA gain profile can be implemented.

Increasing the BBA gain can, in turn, increase the variation in x[n] values for signals received from a COI versus a non-COI. With reference to FIG. 3A, for example, the difference between signal values x[n] of traces 302 and 304 are only about 10-20 LSB. By increasing the BBA gain when processing those signals, the difference in LSB of those values will be increased (i.e., increasing the effective resolution of the signals) and will make it easier for a classifier to process the signal x[n] to distinguish between COI off-ringing signals and non-COI (e.g., metal object) off-ringing signals.

Figure 4:
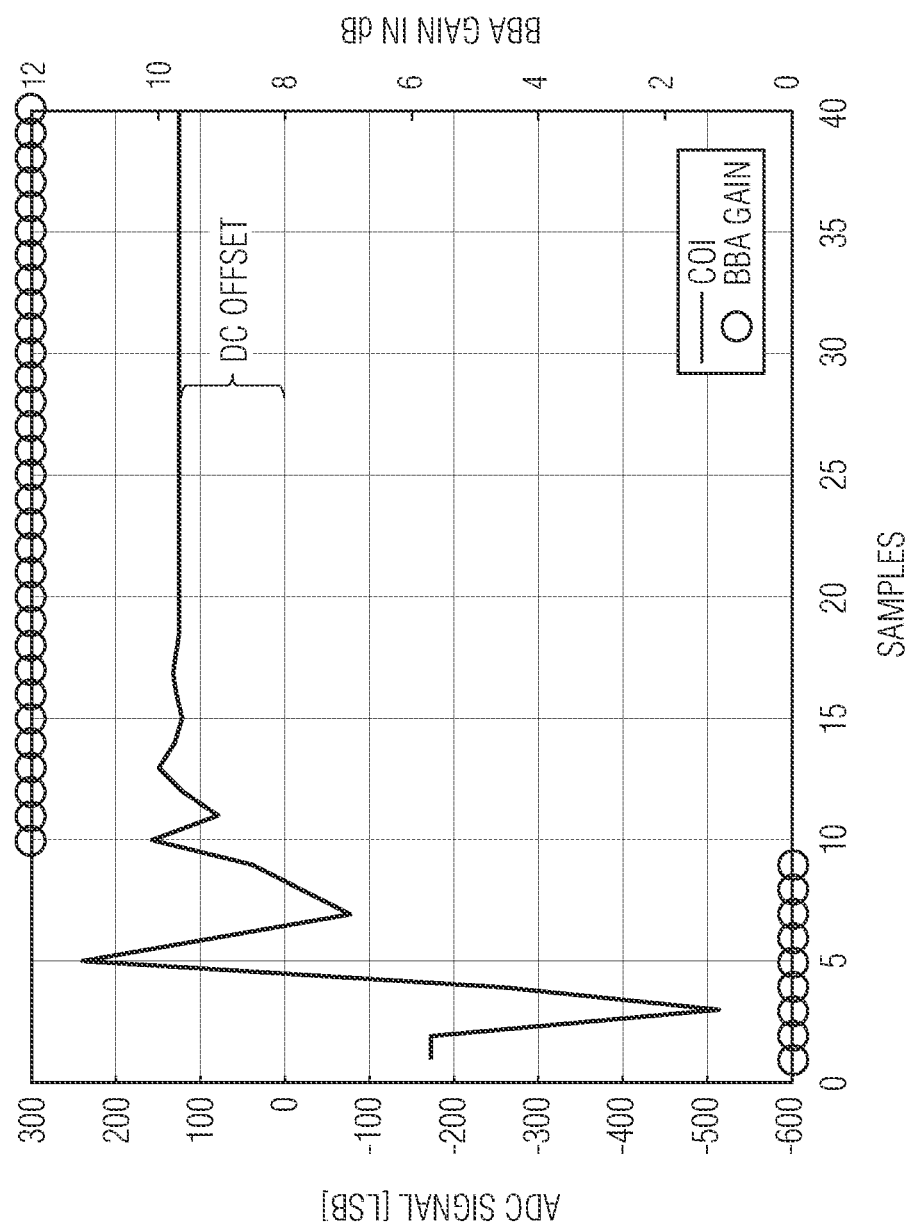
FIG. 4 is a chart depicting a digitized received signal x[n], where BBA gain is set to 0 dB for the first 9 samples of signal x[n] and is switched to 12 dB for the 10th and later samples.

To illustrate, FIG. 4 is a chart depicting a digitized received signal x[n], where BBA gain is set to 0 dB for the first 9 samples of signal x[n] and is switched to 12 dB for the 10$^{th}$ and later samples. In various embodiments, such as those in which a single gain adjustment is performed, the first gain value may be equal to a value less than 2 dB, while the second (greater) gain value may be a value greater than 10 dB.

For the example shown in FIG. 4, m=10. As shown in FIG. 4, more oscillations of the RF off-ringing signals are visible. However, FIG. 4 depicts consequences of dynamically adjusting BBA gain in that, due to the BBA gain increase, any DC offset that may have been present when measuring the received off-ringing signal can become amplified in the portions of the signal x[n] during which BBA gain was increased.

Figure 5:
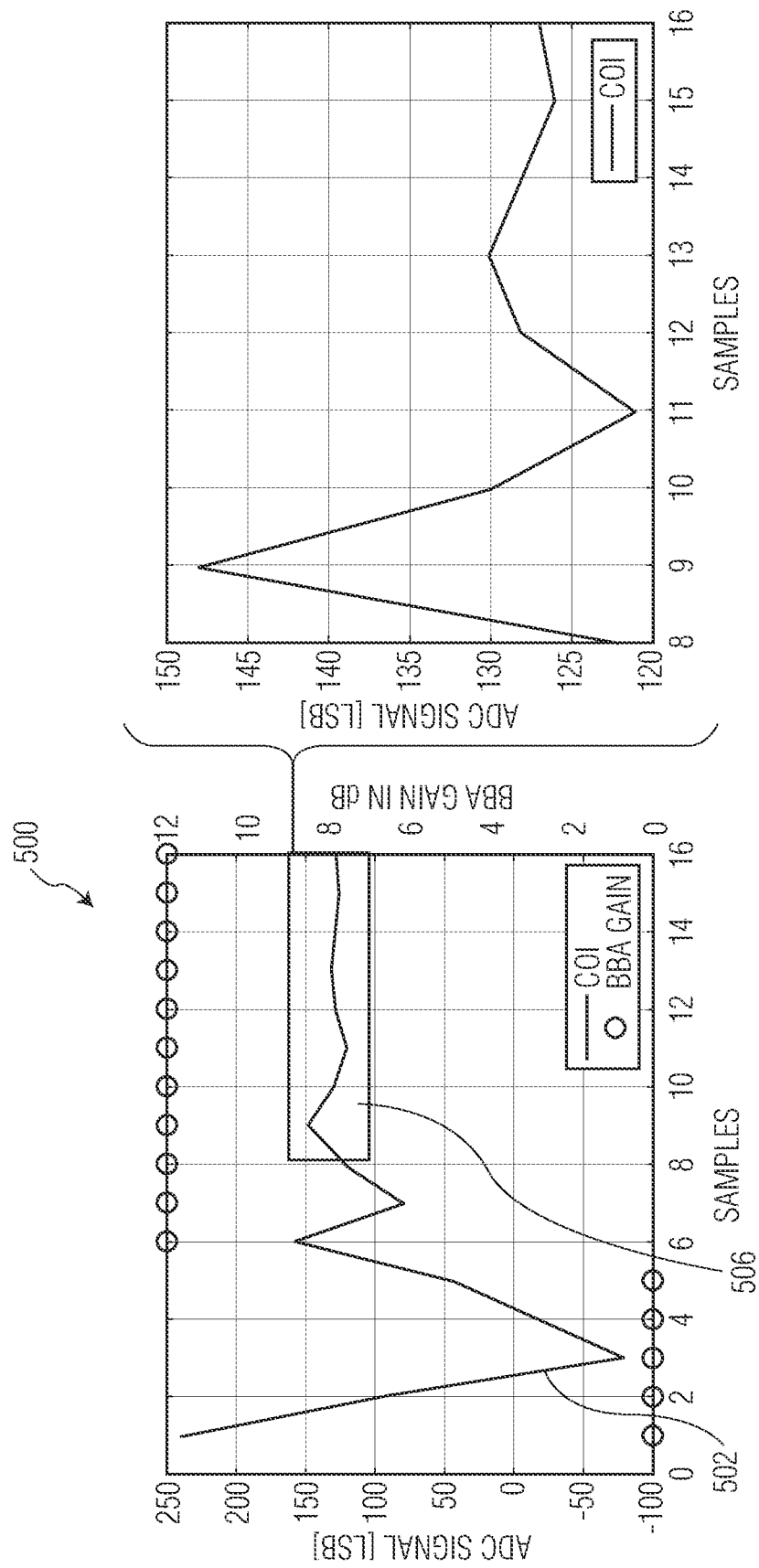
FIG. 5A is a chart depicting a signal generated by a front-end signal processing system of an NFC-enabled device.
FIG. 5B is a chart depicting an enlarged portion of FIG. 5A.

FIG. 5A is a chart 500 depicting a signal generated by a front-end signal processing system (e.g., front end signal processing system 200) of an NFC-enabled device. In chart 500, the horizontal axis represents sample number, which occur over a period of time, while the left vertical axis represents the magnitude of the signal and the right vertical axis indicates the BBA gain at the time the magnitude value was generated. Trace 502 represent the digitized values of the received signal and, as such, the magnitude of the signal (as represented by the left vertical axis) is expressed in LSB values. The signal represented by trace 502 is generated using the same received off-ringing signal as trace 302 of FIGS. 3A and 3B (i.e., a signal received from a COI). In FIG. 5A, however, trace 502 is generated by the front-end signal processing system using a synchronized dynamic BBA gain as compared to trace 302 of FIG. 3A in which no gain adjustment was utilized. FIG. 5B is a chart depicting an enlarged portion 506 of FIG. 5A. As depicted in the enlarged chart of FIG. 5B, it is apparent that more oscillations (and, consequently, more data) is present within trace 502 as compared to the non-dynamically amplified signal represented by trace 302 of FIG. 3B.

As depicted in FIG. 5B, the magnitude of trace 502 representing the low energy decaying portion of the corresponding received signal (i.e., portions of trace 502 occurring at sample number 8 and later) is higher (e.g., ranging from about 123 LSB to about 147 LSB—a spread of 24 LSB values) as compared to the non-dynamically amplified trace 302 (e.g., which only ranges from about 7 LSB to 13 LSB—a spread of only 6 LSB values). The increase in overall magnitude is due to a DC offset in the received signal that, in the dynamically adjusted BBA gain embodiment of FIGS. 5A and 5B, is amplified at a higher gain than the non-dynamically adjusted BBA gain case of FIGS. 3A and 3B.

Before trace 502 is supplied to a classifier for classification of the received signal, therefore, a compensation scheme may be implemented to compensate for that DC offset. Additionally, as described below, the signal x[n] represented by trace 502 may require some further compensation to further modify value in the signal x[n] to provide gain normalization to account for the actual adjusted BBA gain levels implemented during original signal processing.

Figure 6:
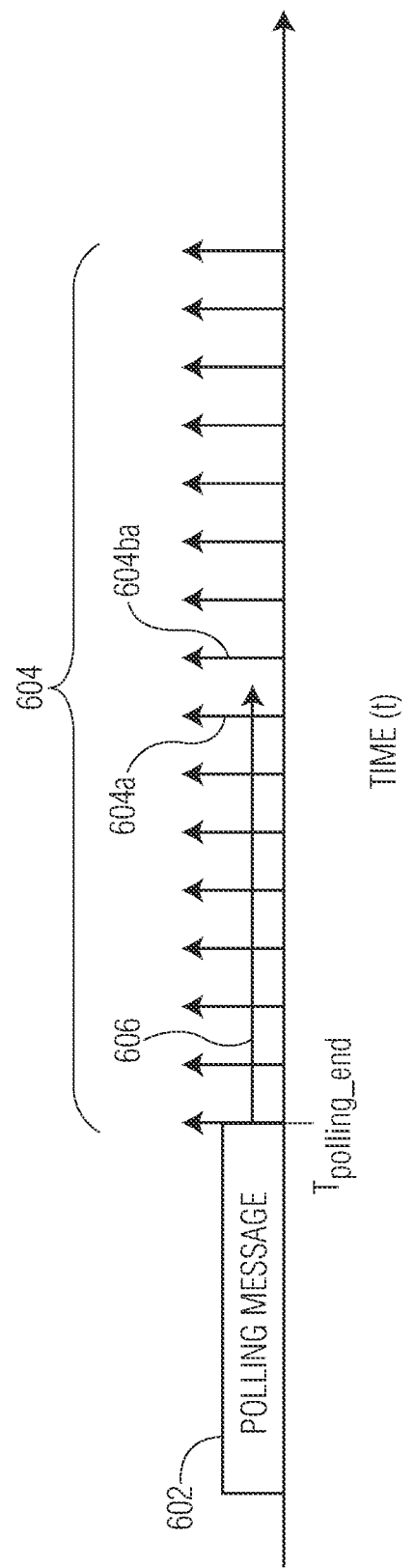
FIG. 6 is a timeline depicting timing synchronization between a device's transmission of a polling message and the device dynamically adjusting a BBA gain of the device's RF received signal processing system.

Consequently, the present signal processing system may be configured to remove a DC offset and perform BBA gain compensation to normalize the processed signal for analysis by an appropriately configured classifier. As described below, the compensation schemes are synchronized with the time at which the device turns off its RF field to begin listening for responsive signals (i.e., the time at which off-ringing signal sampling begins). This enables FIG. 6 is a timeline depicting timing synchronization between a device's transmission of a polling message broadcast and the device dynamically adjusting a BBA gain of the device's RF received signal processing system. The synchronization may also be used to control the DC offset and gain normalization process, as described herein. As depicted, during a first time interval, the device transmits a polling message 602 (e.g., via communication unit 226 of FIG. 2). The polling transmission ends at time t=t$_{polling\_end}$. At that time, the signal processing system (e.g., front-end signal processing system 200 of FIG. 2) begins sampling signals received at an antenna (e.g., antenna 202 of front-end signal processing system 200). This sampling activity is illustrated by arrows 604 on the timeline of FIG. 6. As shown in FIG. 6, the sampling activities occur at a known sampling rate.

Based on a characterization of the NFC-enabled device (and perhaps related communications and protocol standards) it is possible to determine at what time a signal may be received in response to the polling message 602. And, furthermore, it is possible to estimate how long after the initial receipt of the beginning of that signal, the magnitude of that signal may decay to the point that increased BBA amplification is required. With reference to FIG. 6, arrow 606 represents the period of time that may elapse from the time transmission of the polling message ceases transmission (i.e., time t=t$_{polling\_end}$) to the time at which any received signal decays sufficiently that additional BBA amplification is required for proper signal processing. Because samples 604 are being taken at a regular sampling interval being at the time transmission of the polling message 602 ceases, it is possible to determine the last sample 604 that may be taken using a low BBA gain value (i.e., sample 604a) and the first sample 604 at which the BBA gain should be increased (i.e., sample 604b).

Accordingly, the NFC-enabled device may be configured to cause the device's front-end signal processing system to take samples 604 at a first gain level (i.e., a low gain value, such as 0 dB), until sample 604b is reached. At that time, the processor may cause the device's front-end signal processing system to take samples 604 at a second gain level (i.e., a higher gain value, such as about 12 dB). Accordingly, the processor may be configured to adjust gain after a certain, pre-determined, number of samples 604 have been captured. That predetermined value may be stored in a memory that is accessible to the processor. Alternatively, the time duration indicated by arrow 606 (i.e., the time period from initial receipt of a signal in response to polling message 602 to the time that signal decays sufficiently to warrant an increased in BBA gain) may be stored in a memory and retrieved by the processor to determine the specific sample 604 at which BBA gain should be increased. Specifically, using the known sample rate, the processor can determine which samples 604 will be captured after that predetermine time period and increase BBA gain when capturing those samples 604.

FIG. 6 depicts an example timeline in which a signal processing system (e.g., front-end signal processing system 200) is configured to increase BBA gain a single time while processing a received off-ringing signal. It should be understood that other embodiments may be implemented in which BBA gain is increased two or more time while processing a received off-ringing signal, where each BBA gain increase may be triggered upon processing particular sample numbers.

In the present system and method, it should be noted that the increase (or increases) in gain value of the signal processing system's BBA is not triggered based upon a magnitude of the input signal. Instead, the BBA gain level is adjusted based upon a specific time offset from the ceasing of polling message transmission. Accordingly, a particular BBA gain level may be set after a particular time period (e.g., determined by a specific number of samples occurring according to a fixed sampling rate) after the polling broadcast has ceased, where the time period is selected to coincide with the likely time at which a magnitude of a received signal falls below some threshold value indicating that additional amplification is required. The BBA gain adjustments therefore can occur automatically after particular numbers of sample values have been captured and may not depend on a magnitude of the signal being processed.

Figure 7:
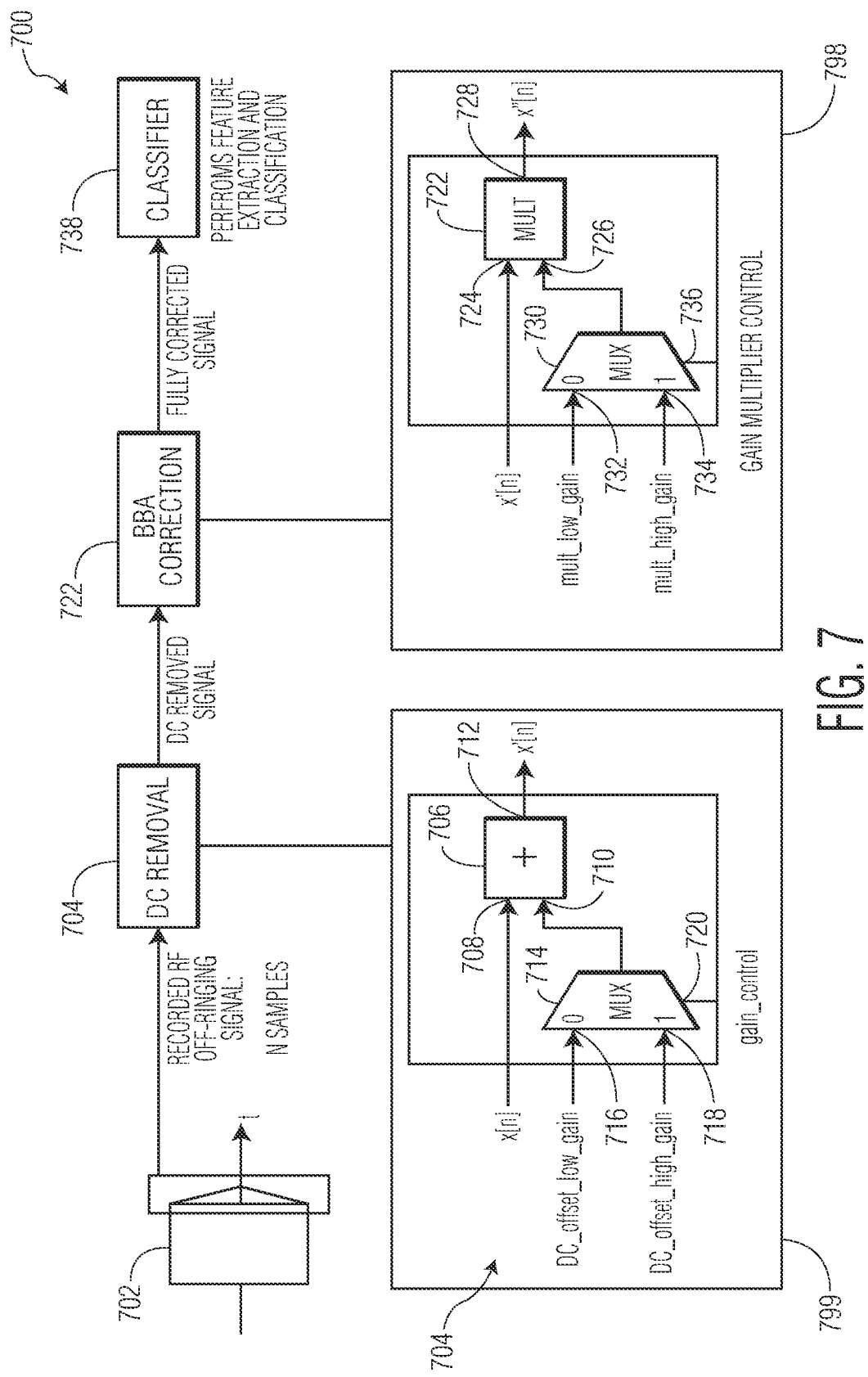
FIG. 7 is a block diagram depicting functional components of a signal processing chain configured to process a digital signal generated by a front-end signal processing system that is configured to use a dynamic BBA gain to increase resolution of a decaying portion of a received off-ringing signal.

FIG. 7 is a block diagram depicting functional components of a signal processing chain 700 configured to process a digital signal generated by a front-end signal processing system (e.g., front-end signal processing system 200 of FIG. 2) that is configured to use a dynamic BBA gain to increase resolution of a decaying portion of a received off-ringing signal. Signal processing chain 700 is configured to receive the digital sample values of a received off-ringing RF signal from front-end signal processing system 702, wherein the digital samples have been generated using a dynamic BBA gain, as described above. The operation of signal processing chain 700 may be synchronized to the time at which generation of a polling broadcast message ceases such that DC offset correction and gain normalization operations are determined by the sample number n in the signal x[n] being processed.

DC removal block 704 is configured to receive the digital sample values from front-end signal processing system 702 and modify those values to remove the DC offset that may be present in the sample values and that was subject to increased BBA gain. Details of DC removal block 704 are illustrated in box 799 of FIG. 7.

Specifically, DC removal block 704 includes an addition block 706. Addition block 706 includes two inputs, the first input 708 is configured to receive the current value x[n] of the input signal received from front-end signal processing system 702. The second input 710 of addition block 706 is configured to receive a DC offset value. The DC offset value received at second input 710 is added to the value x[n] received at input 708 to generate an output value x'[n] at output 712 that is DC offset corrected.

DC removal block 704 includes a multiplexer 714 configured to output a DC offset value that is ultimately supplied to second input 710 of addition block 706. In the depicted example, multiplexer includes two inputs, which is suitable for an implementation front-end signal processing system 702 that is configured to use only two different BBA gain values. Other embodiments of front-end signal processing system 702 may utilize more distinct BBA gain values when processing a received off-ringing RF signal, in which case multiplexer 714 would have a number of inputs equal to the number of different utilized BBA gains so that different DC offsets may be applied to different portions of the digital signal that were processed using the various different BBA gain values.

In this example, first input 716 of multiplexer 714 is configured to receive a first or default DC offset value. Typically, this value will be used to remove the DC offset from portions of the signal x[n] that were processed with the default BBA gain (i.e., with sample number n being less than m). In embodiments where this gain value (e.g., the gain used for samples 0-7 for various examples of this disclosure) is used to process the received off-ringing signal, a relatively small DC offset may result and, as such, the input at first input 716 of multiplexer 714 may be set to relatively small value.

Conversely, second input 718 is configured to receive a second DC offset value. Typically, this value will be used to remove the DC offset from portions of the signal x[n] that were processed with an increased BBA gain. In embodiments where this gain value (e.g., the gain used for samples 8 onwards for various examples of this disclosure) is used to process the received off-ringing signal, a significant DC offset may result in the output signal x[n] and, as such, the input at second input 718 may be set to a non-zero value. For example, with reference to FIG. 5B, where the values of the amplified portion of the signal x[n] oscillate about a value of 135 LSB, the DC offset at second input 718 of multiplexer 714 may be equal to a predetermined DC offset value.

In various embodiments, the DC offset value at second input 718 of multiplexer 714 may be determined via direct measurement before polling occurs. For example, with no polling broadcast being transferred (and so not off-ringing signals being triggered or received), the signal processing system (e.g., front-end signal processing system 200) may switch through all possible gain steps. At each gain step, the resulting DC offset may be measured and stored to memory. Those stored values can then be utilized by the DC removal block 704 to remove the proper amount of DC offset from the received signal x[n] at each BBA gain level. The measured DC offset may be stored as a negative value or as a positive value that is subtracted in the DC removal block 704 of FIG. 7.

Multiplexer 714 includes a control input 720 configured to receive a control input signal that controls whether multiplexer 714 outputs the signal (i.e., the DC offset value) received at first input 716 or second input 718. Typically, the control signal received at control input 720 is configured to cause multiplexer 714 the output the DC offset associated with the default BBA amplifier gain (i.e., the DC offset received at input 716) when the sample n of the signal x[n] being process is less than the value m, where m is the sample number at which front-end signal processing system 702 dynamically increases its BBA amplifier gain.

When the value x[n] being processed has been processed using increased BBA amplifier gain (i.e., the value of n is equal to or greater than m), the control signal at control input 720 changes to cause multiplexer 714 to output the DC offset received at second input 718 at the output of multiplexer 714.

The implementation of DC removal block 704 depicted in FIG. 7 accounts for a signal processing chain that only implements two different BBA gain setting (e.g., a default gain and a single increased value). In embodiments in which BBA gain is adjusted two or more times, it should be apparent that the configured of DC removal block 704 would be modified such that multiplexer 714 has a number of inputs receiving DC offset values for each particular BBA gain value. In that case, the control input received at second input 710 would select between the various inputs of multiplexer 714 so that for samples that were generated with an initial BBA gain value, the corresponding DC offset value for that BBA gain value is output to addition block 706.

It should also be apparent that the implementation of DC removal block 704 depicted in FIG. 7 shows the DC offset values received from multiplexer 714 being added via addition block 706 to the current value x[n] being processed. Such an implementation presumes that the DC offset values are negative values with a magnitude equal to the DC offset and, when added to the value x[n], remove any DC offset. Alternatively, the DC offset values could be positive values, in which addition block 706 may be replaced by a subtraction block.

The output x' [n] (i.e., the input signal x[n] with DC correction) of output 712 of DC removal block 704 is then passed to BBA gain correction block 722. Because dynamic BBA gain adjustment results in a signal x' [n] in which different parts of the signal have been amplified at a different gain level than other parts of the signal (i.e., x' [n] where n is less than m have been amplified at a first, lower, gain level and the portion of x' [n] where n is equal to or greater than m have been amplified at a second, higher, gain level) the signal x' [n] is not suitable for classification—most classifiers would require that all data points with signal x' [n] have been amplified by the same amount. Accordingly, BBA gain correction block 722 is configured to apply a multiplier to signal x' [n] so that all n values of x' [n] have been amplified by the same amount. Details of BBA correction block 722 are illustrated in box 798 of FIG. 7.

Specifically, BBA correction block 722 includes a multiplication block 724. Multiplication block 724 includes two inputs, the first input 726 is configured to receive the current value x' [n] of the input signal received from DC removal block 704. The second input 726 of multiplication block 724 is configured to receive a gain normalization value. The gain normalization value received at first input 726 is multiplied by the value x' [n] received at multiplication block 724 to generate an output value x" [n] at output 728 that has normalized through the entire signal x".

BBA gain normalization block 722 includes a multiplexer 730 configured to output a gain normalization value that is ultimately supplied to first input 726 of multiplication block 724. In the depicted example multiplexer includes two inputs, which is suitable for an implementation front-end signal processing system 702 that is configured to use only two different BBA gain values. Other embodiments of front-end signal processing system 702 may utilize more distinct BBA gain values when processing a received off-ringing RF signal, in which case multiplexer 730 would have a number of inputs equal to the number of different utilized BBA gains so that different gain multiplication values may be applied to different portions of the digital signal that were processed using the various different BBA gain values.

In this example, first input 732 of multiplexer 730 is configured to receive a first or default gain normalization value. Typically, this value will be multiplied by values in x' [n] that were processed with the default BBA gain (i.e., with sample number n being less than m) to increase the effective applied gain to those values so that they have the same effective gain as values of x' [n] where n is equal to or greater than m).

The value of the default normalization value received at first input 732 can be derived from the BBA gain sequence that was used when processing the original signal x[n]. For example, if the default BBA gain setting was 0 dB, and that gain value was raised to 6 dB after m samples, those gain values are equivalent to multiplying the samples taken at 0 dB where n<m by a value of 1 and multiplying the samples taken at 6 dB by 2. In such an example, the gain normalization value received at first input 732 would be equal to the value 2.

Conversely, second input 734 is configured to receive a second gain multiplication value. Typically, this value will be used to normalize effective gain of portions of the signal x[n] that were processed with an increased BBA gain (i.e., values in x[n] where n is equal to or greater than m). As these values were already processed using increased BBA gain, these values will typically not require any increase in effective gain and so the gain multiplication value for these values may be equal to 1.

Multiplexer 730 includes a control input 736 configured to receive a control input signal that controls whether multiplexer 714 outputs the gain multiplication value received at first input 732 or second input 734. Typically, the control signal received at control input 736 is configured to cause multiplexer 730 to output the gain multiplication value associated with the default BBA amplifier gain (i.e., the gain multiplication value received at input 732) when the sample n of the signal x[n] being process is less than the value m, where m is the sample number at which front-end signal processing system 702 dynamically increases its BBA amplifier gain.

When the value x' [n] being processed has been processed using an increased gain normalization value (i.e., the value of n is equal to or greater than m), the control signal at control input 736 changes to cause multiplexer 730 to output the gain normalization value received at second input 734 at the output of multiplexer 730.

In implementations of signal processing chain 700 in which three or more BBA gain values were used to generate the signal x[n], the various multiplication values utilized in performing gain normalization can be similarly derived. In general, the multiplication values are equivalent to the linear values of the gain steps. The amplification values in dB and the corresponding linear values may be determined according to the expression $A_{dB}=20 \cdot \log_{10} (A_{linear})$ in which $A_{db}$ is the amplification level in dB and $A_{linear}$ is the corresponding linear amplification value. As such, in a system that utilizes three different BBA gain values 0 dB, 6 dB, and 12 dB were used to amplify the decaying off-ringing signal, the multiplication values would be the linear values representing 0 dB, 6 dB, and 12 dB gain, which are the values 1, 2, 4. As such, the portion of the signal that was amplified at a BBA gain of 0 dB would be multiplied by the value 4, the portion of the signal that was amplified at a BBA gain of 6 dB would be multiplied by the value 2, and the portion of the signal that was amplified at a BBA gain of 12 dB would be multiplied by the value 1. With the values so normalized, each value in the normalized signal x"[n] has the same equivalent amplification and, as such, the 'shape' of the signal is not distorted even those different amplification levels were used to amplify different portions of the original signal x[n].

The output x"[n] (i.e., the input signal x'[n] with normalized gain) of output 728 of BBA correction block 722 can then be supplied to classifier 738, which is a functional block (e.g., characterization algorithm 238) that may be implemented in software executed by a suitable processor device, such as processor 222 of FIG. 2 to determine whether signal x" [n] is likely received from a COI.

Figure 8A:
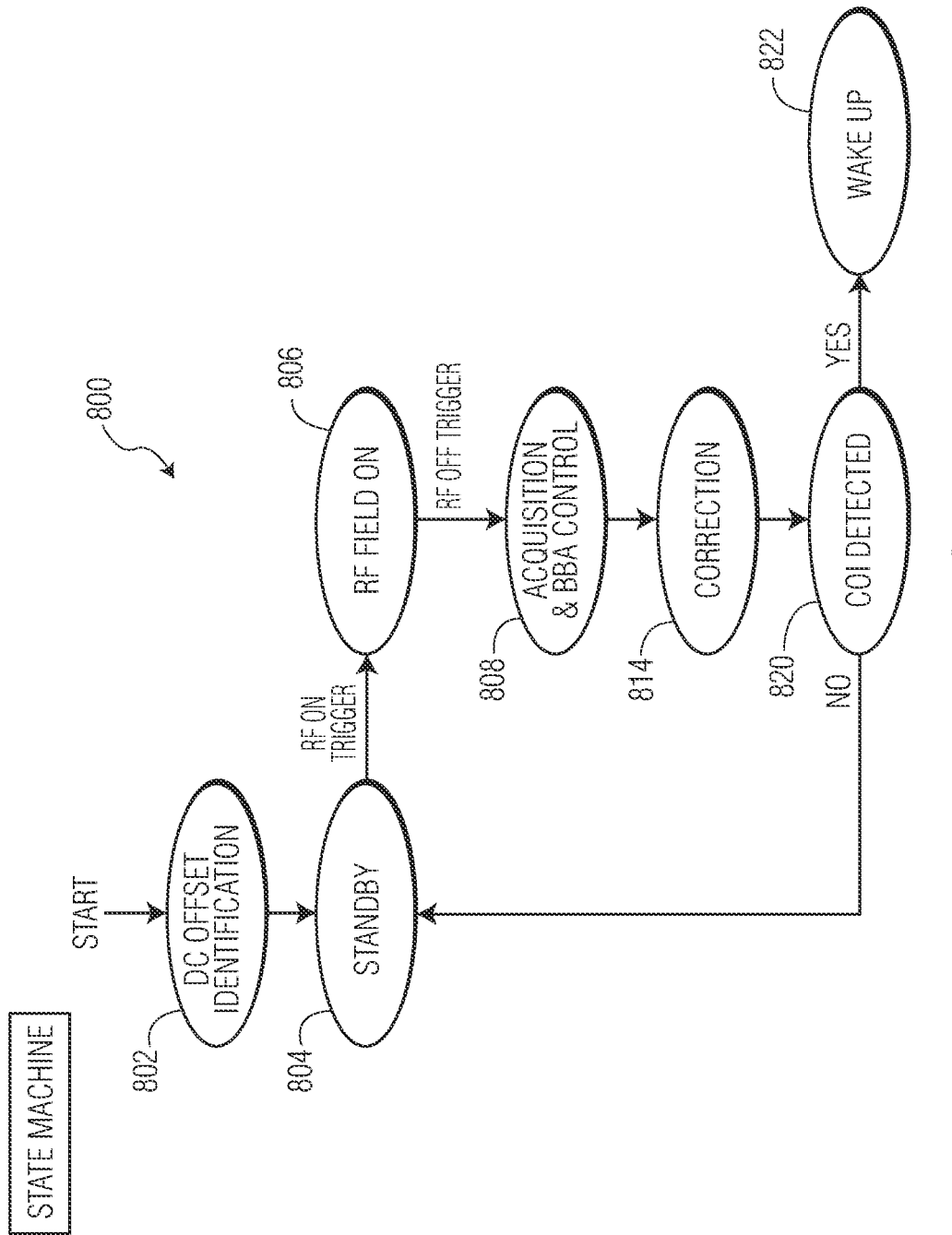
FIG. 8A is a flowchart depicting a method for performing synchronized digital signal processing in accordance with the present disclosure.

FIG. 8A is a flowchart depicting a method 800 for performing synchronized digital signal processing in accordance with the present disclosure. In various embodiments, method 800 may be performed by various combinations of components in a polling NFC device (e.g., polling NFC device 102 of FIG. 1), such as the device's processing unit, in combination with various components of a front-end signal processing system (e.g., front-end signal processing system 200 of FIG. 2).

Before executing method 800, the device enters a start state in which the device's front-end signal processing system is powered-up, but is not generating an output RF field. With the front-end signal processing system powered up, in step 802 DC offset identification can occur. In this step, the DC offset can be determined by direct measurement before the polling and off-ringing signal processing occurs. During the measurement no polling broadcast RF field is present and the signal processing can switch through all possible BBA gain steps and save the corresponding digital signal level output (e.g., output by ADCs 218, 220) as the DC offsets for each BBA gain value. It should be noted that these DC offset measurements may be saved as a negative value or a positive value is subtracted in the DC removal block 704 of FIG. 7.

Upon receipt of an appropriate trigger signal (e.g., from a system timer or other control process running on the device), method 800 moves to step 806 in which the device transmitting a polling message by generating an appropriate output RF field configured to interrogate any NFC-enabled devices (e.g., device 108 of FIG. 1) in the vicinity of the device executing method 800. The RF field representing the polling message is configured, in some cases, to provide electrical energy to in-vicinity NFC-enabled devices and to cause those devices to emit their own RF signals that may be detected by the device performing method 800.

At the conclusion of step 806 (e.g., after a particular amount of time), the RF field is switched off and the method moves to step 808 in which the device's front-end signal processing system is configured to receive and process an off-ringing signal received by the front-end signal processing system's antenna (e.g., antenna 202 of FIG. 2). Step 808, as described herein, may involve the front-end system increasing BBA gain mid-way through receipt and processing of the off-ringing signal.

Typically, the off-ringing signal is measured by the front-end signal processing system by sampling a number of analog magnitude values of the received signal at the antenna and converting those sampled analog values into corresponding digital values to generate an output x[n]. In accordance with the present disclosure, a first number of samples may be made using default BBA amplifier gains to generate a first portion of the output x[n]. Typically, this first portion of the output x[n] represents the sampled values for the high-energy portion of the received signal and represents samples n where n is less than sample m, where m designates the sample number at which additional amplification is required. For samples numbers n equal to or greater than m, the front-end processing signal may increase the BBA gain to increase the resolution of that later captured portion of the received off-ringing signal where the analog magnitude of that portion of the signal may be significantly decayed.

The timing by which the front-end signal processing system samples analog values of the received off-ringing signal is determined by the time at which the RF field was switched off at the conclusion of step 806. Because the samples are taken by front-end signal processing system at regular intervals and it is known, generally, how quickly off-ringing RF signals decay, it is possible to predict the sample number m at which the front-end signal processing system's BBA gain should be increased to increase resolution in the output x[n].

Figure 8B:
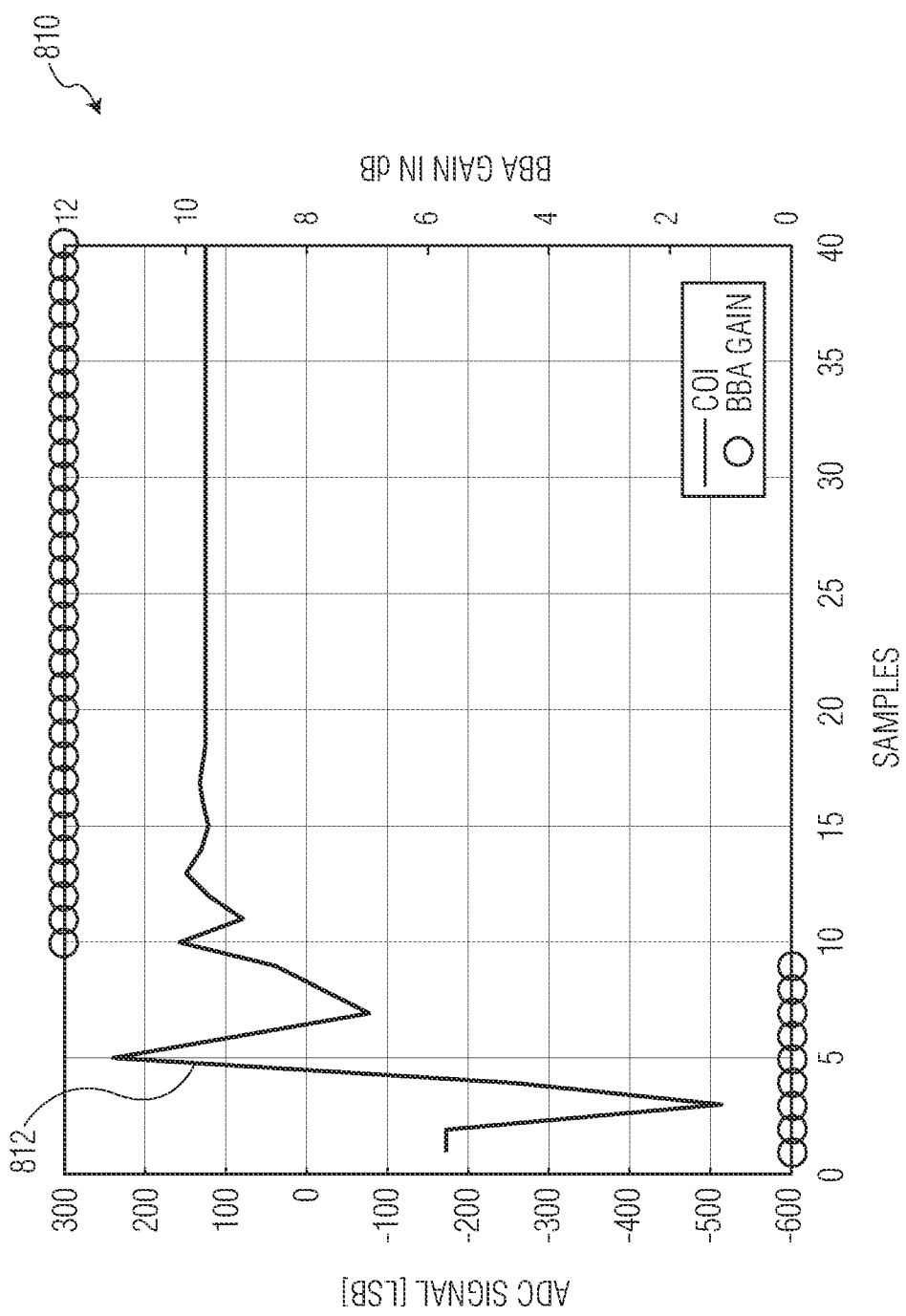
FIG. 8B is a chart depicting the values of x[n] generated according to the method depicted in FIG. 8A.

This process is illustrated in chart 810 of FIG. 8B, which is a chart depicting the values of x[n] via trace 812. The horizontal axis of chart 810 represents sample number, the left vertical axis of chart 810 represents the value of x[n], and the right vertical axis represent BBA gain. The circle values in chart 810 depict how, when the first few samples of x[n] were generated, the BBA gain was set to 0 dB, however for samples having n equal to or greater than 9 (i.e., m is equal to 9), the BBA gain was increased to 12 dB.

As described above, this dynamic BBA gain approach for generating the output x[n] can result in DC offsets and gain disparities in the output signal x[n] that require correction before the output can be processed by an appropriate classifier to determine whether the signal associated with the output signal was received from a COI or non-COIs, such as nearby metal objects.

Accordingly, in step 814, the output x[n] is modified to correct that DC offset (e.g., using DC removal block 704 of signal processing chain 700) and normalize gain (e.g., using BBA correction block 722 of signal processing chain 700) to generate a corrected output signal x"[n]. Specifically, DC offset correction is performed (e.g., using DC removal block 704 of FIG. 7 and as described above) to generate a first corrected output x'[n]. That DC-corrected output is then processed to normalize gain and generate a further corrected output x"[n].

Once the corrected signal x"[n] is determined, in step 820, the signal x"[n] is processed (e.g., via a suitably configured classifier) to determine whether the signal x"[n] is associated with a COI. If so, in step 822, the device wakes up and enters a high-power usage mode enabling the device to communicate further with the COI. If the signal x"[n] is not classified as being associated with a COI, the method returns to step 804 and the device enters a standby mode.

Figure 8C:
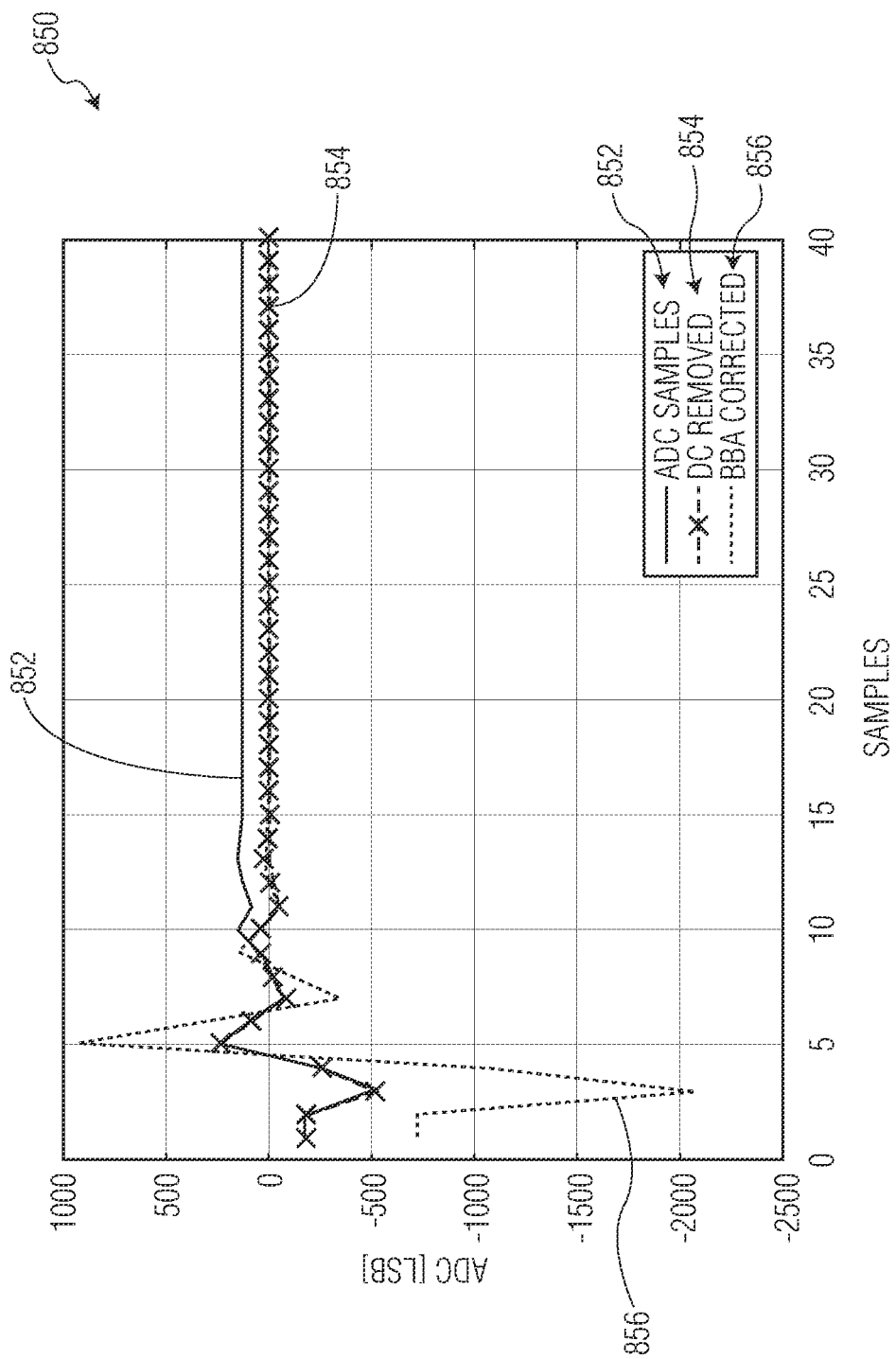
FIG. 8C is a chart depicting each of the signals x[n], x'[n], and x"[n] as they are generated according to the method of FIG. 8A.

FIG. 8C is a chart 850 depicting each of the signals x[n], x'[n], and x"[n] as they are generated according to method 800 of FIG. 8A. In chart 850, the horizontal axis represents sample number n, and the vertical axis represents the magnitude of the signals x[n], x'[n], and x"[n]. Within chart 850, line 852 represents the signal x[n], in which no DC offset correction or gain normalization has been performed. Line 854 represents the signal x'[n] in which DC offset correction has been performed. As illustrated in chart 850 the magnitude of values of line 854 with sample number equal to or greater than m (in this example m=9) has been reduced to compensate for the increased for the DC offset included in those values to the increased BBA gain. Within chart 850, line 856 represents the signal x"[n] in which gain normalization has been performed.

In some aspects, the techniques described herein relate to a system, including: a communication unit configured to broadcast a radio frequency polling signal; a signal processing unit including: an antenna configured to receive a radio frequency signal as a received radio frequency signal, a baseband amplifier coupled to the antenna, the baseband amplifier being configured to amplify the received radio frequency signal and output an amplified radio frequency signal that corresponds to the received radio frequency signal, an analog to digital converter configured to receive the amplified radio frequency signal and generate an output digital value that corresponds to a magnitude of the amplified radio frequency signal, and a baseband amplifier controller configured to modify an amplification gain of the baseband amplifier; and a processor configured to: cause the baseband amplifier controller to set the amplification gain of the baseband amplifier to a first gain value, determine a predetermined number of sample values, periodically record, at a sample rate, the output digital value from the analog to digital converter to generate a first plurality of sample values, wherein the first plurality of sample values includes a number of sample values equal to the predetermined number of sample values, after generating the first plurality of sample values, cause the baseband amplifier controller to set the amplification gain of the baseband amplifier to a second gain value, periodically record, at the sample rate, the output digital value from the analog to digital converter to generate a second plurality of sample values, and transmit the first plurality of sample values and the second plurality of sample values to a classifier module to determine whether the radio frequency signal is received from a near-field communication-enabled device in response to the radio frequency polling signal.

In some aspects, the techniques described herein relate to a system, including: a communication unit configured to generate a radio frequency polling signal; a signal processing unit including: an antenna configured to receive a radio frequency signal as a received radio frequency signal, and a baseband amplifier coupled to the antenna, the baseband amplifier being configured to amplify the received radio frequency signal to output an amplified radio frequency signal; and a processor configured to: cause the communication unit to stop generating the radio frequency polling signal, set an amplification gain of the baseband amplifier to a first gain value, periodically record, at a sample rate, an indication of a magnitude of the amplified radio frequency signal to generate a plurality of sample values, at a predetermined time period after the communication unit stopped generating the radio frequency polling signal, set the amplification gain of the baseband amplifier to a second gain value, and transmit the plurality of sample values to a classifier module to determine whether the radio frequency signal is received from a near-field communication-enabled device.

In some aspects, the techniques described herein relate to a method, including: causing a communication unit of a near-field communication (NFC) to stop broadcasting an NFC polling message; setting an amplification gain of a baseband amplifier of a signal processing unit to a first gain value, periodically recording, at a sample rate, an indication of a magnitude of a radio frequency signal received via an antenna to generate a plurality of sample values, after a predetermined time period, setting the amplification gain of the baseband amplifier to a second gain value, and transmitting the plurality of sample values to a classifier module to determine whether the radio frequency signal is received from a near-field communication-enabled device.

Although veracious embodiments of the present invention have been presented in which NFC-communication offringing signals are processed using two BBA gain settings (i.e., a normal or default gain setting and an increased gain setting), it should be apparent that the present system and method may be implemented using three or more gain settings, in conjunction with corresponding DC offset correction and gain normalization.

The preceding detailed description is merely illustrative in nature and is not intended to limit the embodiments of the subject matter or the application and uses of such embodiments.

As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

The connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used herein for the purpose of reference only, and thus are not intended to be limiting, and the terms "first", "second" and other such numerical terms referring to structures do not imply a sequence or order unless clearly indicated by the context.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common node).

The foregoing description refers to elements or nodes or features being "connected" or "coupled" together. As used herein, unless expressly stated otherwise, "connected" means that one element is directly joined to (or directly communicates with) another element, and not necessarily mechanically. Likewise, unless expressly stated otherwise, "coupled" means that one element is directly or indirectly joined to (or directly or indirectly communicates with, electrically or otherwise) another element, and not necessarily mechanically. Thus, although the schematic shown in the figures depict one exemplary arrangement of elements, additional intervening elements, devices, features, or components may be present in an embodiment of the depicted subject matter.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A system, comprising:
    a communication unit configured to broadcast a radio frequency polling signal;
    a signal processing unit including:
        an antenna configured to receive a radio frequency signal as a received radio frequency signal,
        a baseband amplifier coupled to the antenna, the baseband amplifier being configured to amplify the received radio frequency signal and output an amplified radio frequency signal that corresponds to the received radio frequency signal,
        an analog-to-digital converter configured to receive the amplified radio frequency signal and generate an output digital value that corresponds to a magnitude of the amplified radio frequency signal, and
        a baseband amplifier controller configured to modify an amplification gain of the baseband amplifier; and
    a processor configured to:
        cause the baseband amplifier controller to set the amplification gain of the baseband amplifier to a first gain value,
        determine a predetermined number of sample values,
        periodically record, at a sample rate, the output digital value from the analog-to-digital converter to generate a first plurality of sample values, wherein the first plurality of sample values includes a number of sample values equal to the predetermined number of sample values, after generating the first plurality of sample values, cause the baseband amplifier controller to set the amplification gain of the baseband amplifier to a second gain value, periodically record, at the sample rate, the output digital value from the analog-to-digital converter to generate a second plurality of sample values, and transmit the first plurality of sample values and the second plurality of sample values to a classifier module to determine whether the radio frequency signal is received from a near-field communication-enabled device in response to the radio frequency polling signal.

2. The system of claim 1, wherein the processor is configured to cause the communication unit to stop generating the radio frequency polling signal before recording the output digital value from the analog-to-digital converter to generate the first plurality of sample values.

3. The system of claim 1, wherein the first gain value is less than the second gain value.

4. The system of claim 3, wherein the first gain value is less than 2 dB and the second gain value is greater than 10 dB.

5. The system of claim 1, wherein the predetermined number of sample values is at least partially determined by the sample rate.

6. The system of claim 5, wherein the predetermined number of sample values is retrieved from a memory device that is connected to the processor.

7. The system of claim 1, wherein the processor is configured to perform direct-current offset correction by removing a first direct-current offset value from each of the values in the first plurality of sample values and removing a second direct-current offset value from each of the values in the second plurality of sample values.

8. The system of claim 1, wherein the processor is configured to perform gain normalization by multiplying each value in the first plurality of sample values by a gain normalization value.

9. A system, comprising:
a communication unit configured to generate a radio frequency polling signal;
a signal processing unit including:
an antenna configured to receive a radio frequency signal as a received radio frequency signal, and
a baseband amplifier coupled to the antenna, the baseband amplifier being configured to amplify the received radio frequency signal to output an amplified radio frequency signal; and
a processor configured to:
cause the communication unit to stop generating the radio frequency polling signal,
set an amplification gain of the baseband amplifier to a first gain value,
periodically record, at a sample rate, an indication of a magnitude of the amplified radio frequency signal to generate a plurality of sample values,
at a predetermined time interval after the communication unit stopped generating the radio frequency polling signal, set the amplification gain of the baseband amplifier to a second gain value, and
transmit the plurality of sample values to a classifier module to determine whether the radio frequency signal is received from a near-field communication-enabled device.

10. The system of claim 9, wherein the first gain value is less than the second gain value.

11. The system of claim 10, wherein the first gain value is less than 2 dB and the second gain value is greater than 10 dB.

12. The system of claim 9, wherein the received radio frequency signal is received in response to the radio frequency polling signal.

13. The system of claim 9, where the predetermined time interval is expressed as a number of samples.

14. The system of claim 13, wherein the number of samples is between eight samples and 12 samples.

15. The system of claim 9, wherein the processor is configured to, after determining that the radio frequency signal is received from the near-field communication-enabled device, transmit, using the communication unit, a message to the near-field communication-enabled device.

16. The system of claim 9, wherein the processor is configured to perform direct-current offset correcting by removing a first direct-current offset value from each of the values in the plurality of sample values that were recorded before the predetermined time interval and removing a second direct-current offset value from each of the values in the plurality of sample values that were recorded after the predetermined time interval.

17. The system of claim 9, wherein the processor is configured to perform gain normalization by multiplying each value in the plurality of sample values that were recorded before the predetermined time interval by a gain normalization value.

18. A method, comprising:
causing a communication unit of a near-field communication (NFC) to stop broadcasting an NFC polling message;
setting an amplification gain of a baseband amplifier of a signal processing unit to a first gain value,
periodically recording, at a sample rate, an indication of a magnitude of a radio frequency signal received via an antenna to generate a plurality of sample values,
after a predetermined time interval, setting the amplification gain of the baseband amplifier to a second gain value, and
transmitting the plurality of sample values to a classifier module to determine whether the radio frequency signal is received from a near-field communication-enabled device.

19. The method of claim 18, further comprising:
removing a first direct-current offset value from each of the values in the plurality of sample values that were recorded before the predetermined time interval; and
removing a second direct-current offset value from each of the values in the plurality of sample values that were recorded after the predetermined time interval.

20. The method of claim 18, further comprising performing gain normalization by multiplying each value in the plurality of sample values that were recorded before the predetermined time interval by a gain normalization value.

* * * * *